(12) United States Patent
Pipo et al.

(10) Patent No.: US 7,131,761 B2
(45) Date of Patent: *Nov. 7, 2006

(54) SELF-ILLUMINATING FABRICATED SOLID MATERIAL OBJECTS

(76) Inventors: Walter E. Pipo, 1433 Boies Rd., East Aurora, NY (US) 14052; Daniel Seely, 4360 Seneca St., West Seneca, NY (US) 14224

( * ) Notice: Subject to any disclaimer, the term of this patent is extended or adjusted under 35 U.S.C. 154(b) by 207 days.

This patent is subject to a terminal disclaimer.

(21) Appl. No.: 10/661,420

(22) Filed: Sep. 13, 2003

(65) Prior Publication Data

US 2005/0057944 A1    Mar. 17, 2005

(51) Int. Cl.
G09F 13/18    (2006.01)
G02B 6/42    (2006.01)

(52) U.S. Cl. .................. 362/559; 362/153.1; 362/555; 362/576; 40/547; 385/901

(58) Field of Classification Search ................ 362/554, 362/555, 559, 560, 565, 566, 576; 40/547; 385/88, 92, 94, 901
See application file for complete search history.

(56) References Cited

U.S. PATENT DOCUMENTS

| | | | | |
|---|---|---|---|---|
| 2,367,858 A | * | 1/1945 | Flynn | 362/559 |
| 2,501,160 A | * | 3/1950 | Clarke | 362/559 |
| 2,933,853 A | * | 4/1960 | Laval, Jr. | 362/565 |
| 3,943,815 A | * | 3/1976 | Gilbert | 362/559 |
| 4,744,014 A | | 5/1988 | Harris | |
| 4,754,372 A | * | 6/1988 | Harrison | 362/565 |
| 5,619,182 A | * | 4/1997 | Robb | 362/545 |
| 6,082,886 A | | 7/2000 | Stanford | |
| 6,234,657 B1 | * | 5/2001 | Shih | 362/559 |
| 6,712,493 B1 | * | 3/2004 | Tell et al. | 362/565 |
| 2002/0044444 A1 | | 4/2002 | Forster | |
| 2003/0048634 A1 | | 3/2003 | You et al. | |
| 2003/0079387 A1 | | 5/2003 | Derose | |
| 2003/0090896 A1 | | 5/2003 | Sooferian | |

* cited by examiner

*Primary Examiner*—Alan Cariaso
(74) *Attorney, Agent, or Firm*—Patricia M. Costanzo

(57) ABSTRACT

Self-illuminating fabricated solids, e.g., a pavers, driveway stones, building blocks, or statuary having an assembly, of optical fibers having second ends contained within a first end of a receptacle, embedded within the solid object so that the first end of the fibers visually terminate at the object's surface. The second end of the receptacle is exposed at the object's surface to reversibly receive and position a reversibly powered light source in operative contact with the fiber's second ends guiding light from the source through the fibers to the surface of the fabricated object providing for self-illuminating seasonal designs, informational text, or advertising. A plurality of designs in various colors may exist on a single object. These durable objects have a long life as surface exposed fibers wear with the surface of the object and worn-out light sources are easily and rapidly replaced.

18 Claims, 8 Drawing Sheets

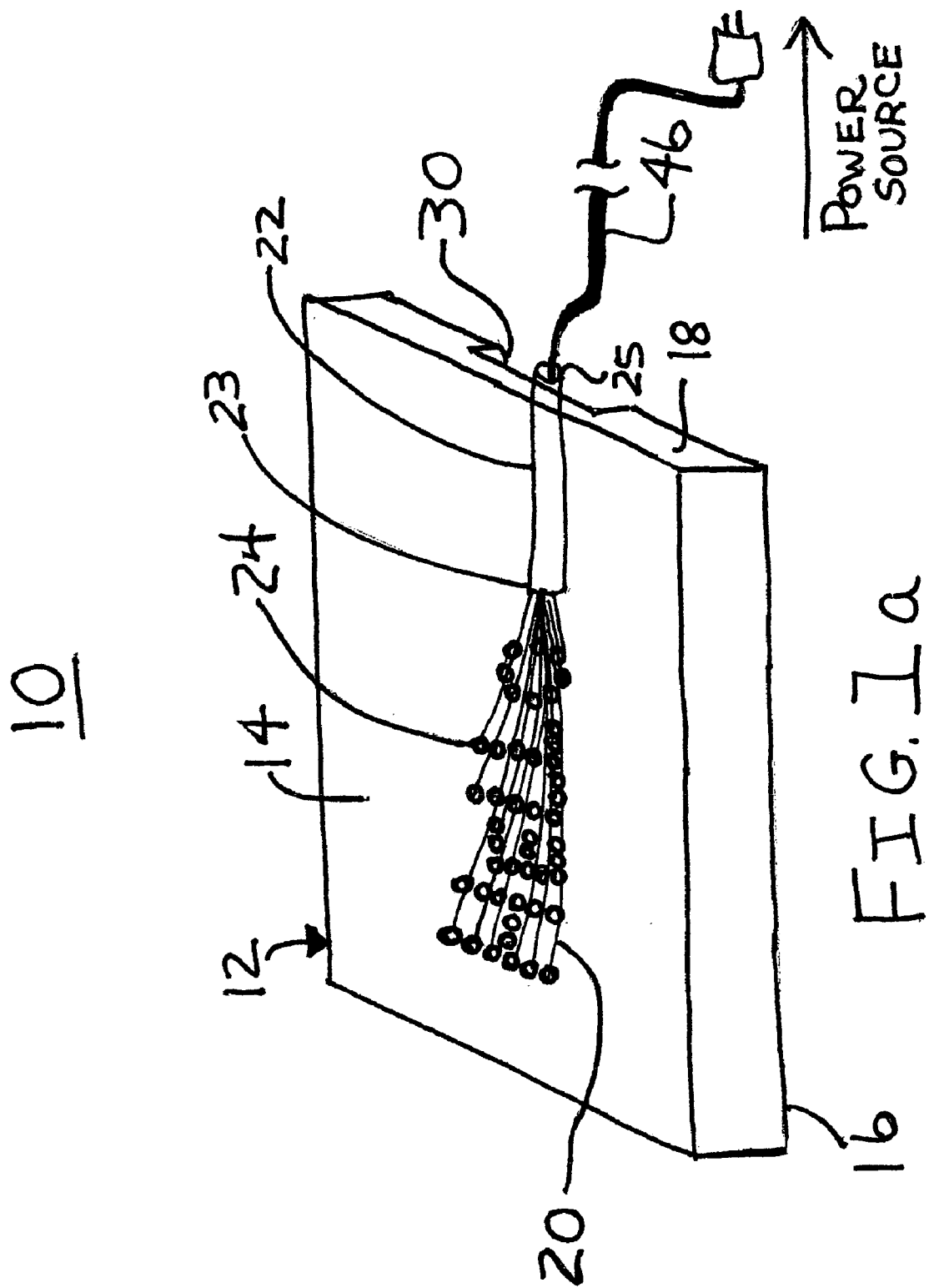

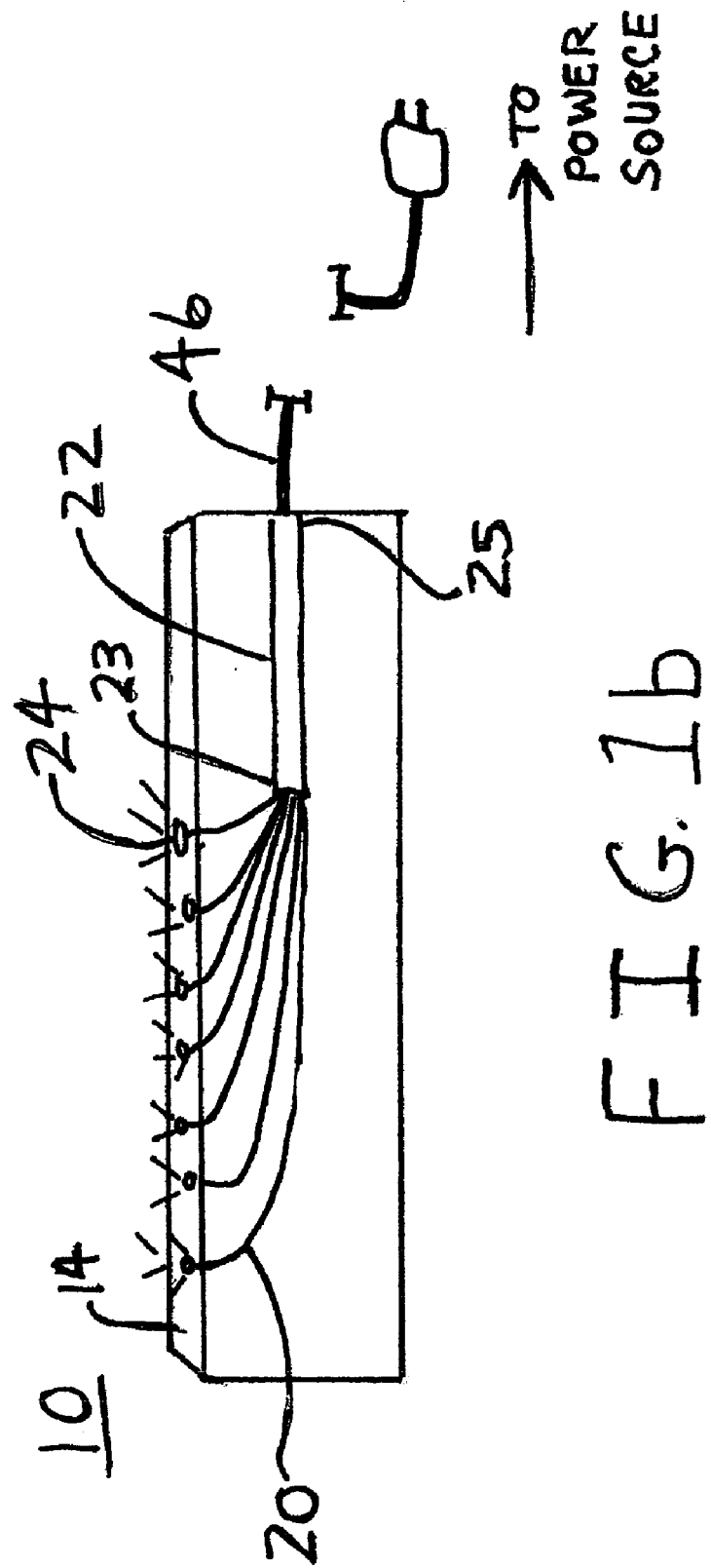

SELF-ILLUMINATING FABRICATED SOLID MATERIAL OBJECTS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to self-illuminating objects and more particularly to self-illuminating, fabricated, solid objects embodying designs, greetings, or information in a choice of colors.

The background information discussed below is presented to better illustrate the novelty and usefulness of the present invention. This background information is not admitted prior art.

Examples of materials that can be fabricated into solid objects include cement, concrete, plaster, fiberglass, glass, and plastics, to name just a few. These materials may be fabricated into a solid by the setting (i.e., the solidification or hardening) of a liquid or a suspension, by pressing a powdered material into a mold, or any similar known techniques. Fabricated solids can be shaped into a vast variety of objects from an artistically sculpted lawn or garden decoration to paving stones for a patio, walkway, or driveway. Historically, lighting for these surfaces has been mainly from spotlights or appropriately placed lights. There have been some attempts to provide self-illuminating fabricated solid objects, but most efforts in this direction rely on the presence of one or more cavities within the solid objects in which a light source system is housed. These cavities create a structural weakness and a place for moisture or other contaminants to collect.

An example of these illuminating solids include illuminating blocks that are to be used mainly on the periphery of walkways. The light source providing the illumination is placed within transparent, flexible, tubing-like material that is positioned within a recessed channel that is open to the top surface of the stone. To provide power to the light source, an electrical junction box must be inserted into a second, much larger cavity that opens to the bottom surface of the block. These systems, however, present several problems. To avoid moisture from reaching the lighting units, filler must be placed within the flexible, tube-like material around the light source. The filler, of course, also must be transparent so as not to prevent the light from emanating from the surface of the object. The rather large cavity required to house the power system creates a structural weakness within the fabricated solid object. The relatively soft, transparent material used as a surface cover creates additional problems. The soft material cannot withstand the damaging effects of both physical and chemical weathering to which it is exposed, nor can it stand up to the wearing effects of pedestrian or vehicular traffic. What is sorely needed is the means to provide a self-illuminating solid object having a surface that is impervious to the damaging effects of both physical and chemical weathering and impervious to the daily wear that occurs on surfaces on which people and vehicles move.

Other attempts to provide illuminating surfaces rely on wiring that must be embedded into a surface topping, such as asphalt or concrete, as the topping is applied. Cavities must be cut into the surface topping so that the wiring can be connected to a light producing assemblage that must be fitted into each cavity. This type of system use a soft, plastic-like material placed over the light elements through which the light can emanate, but this approach suffers from the same limitations of poor durability as discussed above. Additionally, these systems can only be used in the initial installation of a walkway or a roadway. What is needed is the means to provide for self-illuminating fabricated solid objects that can be used in new and previously installed walkways or driveways, or on any other type of existing hard surface, whether the surface is horizontal, vertical, or inclined.

While some of these attempts to provide for in-pavement lighting use LEDs (light emitting diodes) as a light source, they also rely on a system of optical lenses and prisms to direct the light. These lenses and prisms, however, result in glass or other transparent or translucent weak material being located on the surface of these rather complex housings. To avoid damage from overhead foot or vehicular traffic these units can only be placed on the edge of the walkway or driveway. What is lacking in the art is a homogenous solid matrix incorporating LED light sources within a fabricated solid object that can be used in new or existing walks or driveways and that will last for the life of the solid fabricated object.

Furthermore, there have been attempts to provide illuminating solid materials made in or conveying designs to meet almost any occasion, such as a holiday, birthday, seasonal event, wedding, birth, etc. These are limited, though, by the fact that they must be fabricated from clear transparent materials such as methylmethacrylate, Lexan®, acrylic, or the like. Moreover, these solid materials must be etched or grooved to disperse light from the light source that must be inserted into a cavity formed in the material. These materials are inherently soft in the sense that they would not be practical for use where they would be continuously exposed to harsh weather conditions or more than occasional physical wear and tear. There is still an unmet need for a means to provide for fabricated hard material objects having incorporated illumination that is durable under even harsh conditions and can be presented with almost any desired design, or multiple alternating designs, in almost any desired color.

Recently, solar powered stepping stones have been described. These, however, still rely on a sealed housing provided with a soft-material translucent lens through which the solar powered light can diffuse. The translucent material is preferably an acrylic resin which will not support heavy vehicular or pedestrian traffic. What is missing from the art are fabricated resistant solid material objects that are self-illuminating, wherein the power for the illumination is provided by solar power, and where the solar-powered object maintains its durability even under harsh conditions including the damaging effects of physical and chemical weathering and heavy vehicular and pedestrian traffic, and can be offered in almost any desired design in almost any desired color.

Recently stepping stone illuminating systems having a light source embedded within the material from which an object is made, have been described. While these systems are generally durable when exposed to the traffic expected when used as walkway or driveway building materials, they do not provide any means for replacing a worn-out, damaged, or imperfect light source. In the recently described systems, all optical fibers, electronic circuitry, and light sources are permanently sealed and permanently imbedded within the material used to form the object, such as a paving block. To replace a light source in this system, the entire block would have to be replaced. Because the electrical supply means extend outside of the block, this system also suffers from the disadvantage that the paving blocks must be installed over a compressible aggregate, such as finely crushed gravel, in order to provide for the external wiring. Although this system allows for the use of a variety of colored light sources, once a color for the lights in a given block is chosen, there is no way to change the color of the lights, such as from orange for Halloween celebration to red and green for a Christmas theme, without replacing the entire block. Furthermore, this system makes no provision for a choice of design of a given block such as the choice to change from a pumpkin to a Christmas tree—again, the only choice is to change the entire block.

Thus, it has been shown that all of the present known attempts to provide for a self-illuminating fabricated solid present problems that include solids that require chambers, grooves, channels, pockets or panels of significant size for housing a light bulb or other light source from which light is emitted through a soft material located on the top surface of the solid. Additionally, none of these devices provides for an illuminating fabricated solid object, such as a paving block or stepping stone that has the strength, versatility and functionality of a concrete block or stepping stone, that provides for a lighted surface that includes various colors, patterns, or designs of light which may cover either part or the entire surface of the block or stone, and where the light source, the color, and the design can be changed or replaced easily and rapidly without having to replace the entire object.

In view of the foregoing, it is desirable to provide for self-illuminating, fabricated, objects, such as self-illuminating paving blocks or stones that emit light from their surfaces while maintaining the strength and durability expected from a comparable concrete paver or stepping stone, and that can do so at low cost while being attractive in appearance, versatile, functional, and durable. Such self-illuminating objects should be able to be manufactured in almost any desired shape, with almost any design, or designs, in almost any desired color, where the colors, design, and light source can be rapidly and easily changed or replaced without the need to replace the entire object, and where the fabricated hard objects can be used on either hard or compressible surfaces, as desired.

SUMMARY

The present invention satisfies the heretofore unmet need for self-illuminating, fabricated, solid objects, such as self-illuminating paving blocks, building stone, or statuaries that emit light from their surfaces, while possessing strength comparable to a non-illuminating concrete, or other suitable material, paving blocks, building stones, or cast statues, providing for inexpensive to manufacture, self-illuminating fabricated solid objects, that are attractive, versatile, functional, and adapted to include one or more patterns of various colored light and where the colors, design, and light source may be rapidly and easily changed or replaced without the need to replace the entire object, and where the fabricated hard objects are useable on either hard or compressible surfaces, as desired. Self-illuminating objects made according to the teachings of the present invention require little or no maintenance.

The present invention achieves the above and more by setting forth novel self-illuminating fabricated solid objects, such as paving stones or statuary, wherein the objects have any known, or yet to be known, optical fibers embedded within, where one end of the optical fibers are exposed at a visually exposed surface of an object, and while second ends of the optical fibers are contained within a first end of an open receptacle also embedded within the object except for a second end of the receptacle that is exposed at a surface of the object. The exposed receptacle end is adapted to reversibly receive a reversibly powered light source to achieve contact of the fiber's second ends with the light source so that light emitted from the light source is thereby guided from the source through the fibers to the surface of the fabricated object providing for any colored self-illuminating patterns, seasonal designs, informational text, or advertising. A plurality of designs in various colors may exist on a single object. These durable objects have a long life as surface exposed fibers wear with the surface of the object and worn-out light sources are easily and rapidly replaced.

The self-illuminating objects are formed by casting, molding, or pressing, or any other method that results in the making of a fabricated, solid object. The objects can be made of any material having properties amenable to the final intended use of the self-illuminating object, such as concrete or cement if it is desired to manufacture self-illuminating paving or building blocks or stones. Cement or concrete, as well as clay, plastic, plaster, fiber glass, and glass may be employed to manufacture statuary, memorial stones, or name plaques, for example. The manufacturing material may be opaque, translucent, or transparent.

The receptacle can be of any shape that will accommodate a desired light source. The receptacle can be of any material that will provide for the degree of protection desired for the light source. These choices will, of course, be dictated by the intended final use of the self-illuminating fabricated object.

The light source can be any light source. In the examples discussed below the preferred light source is a light emitting diode (LED). The light source can be powered by traditional AC electrical sources, electrical batteries, or other powering source, such as solar energy. If a LED light source is employed, the system requires only low power, such as a 12 volt source and is thus economical to run and energy efficient.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict a few preferred embodiments of the present invention and are not therefore to be considered limiting in scope. Thus, the invention will be described and explained with added specificity and detail through the use of the accompanying drawings, in which:

FIG. 1a is a transparent perspective top view of a self-illuminating object assembly according to the teachings of the present invention, FIG. 1b is a transparent perspective side view of a self-illuminating object assembly as shown in FIG. 1.

DEFINITIONS

Figure 1C:
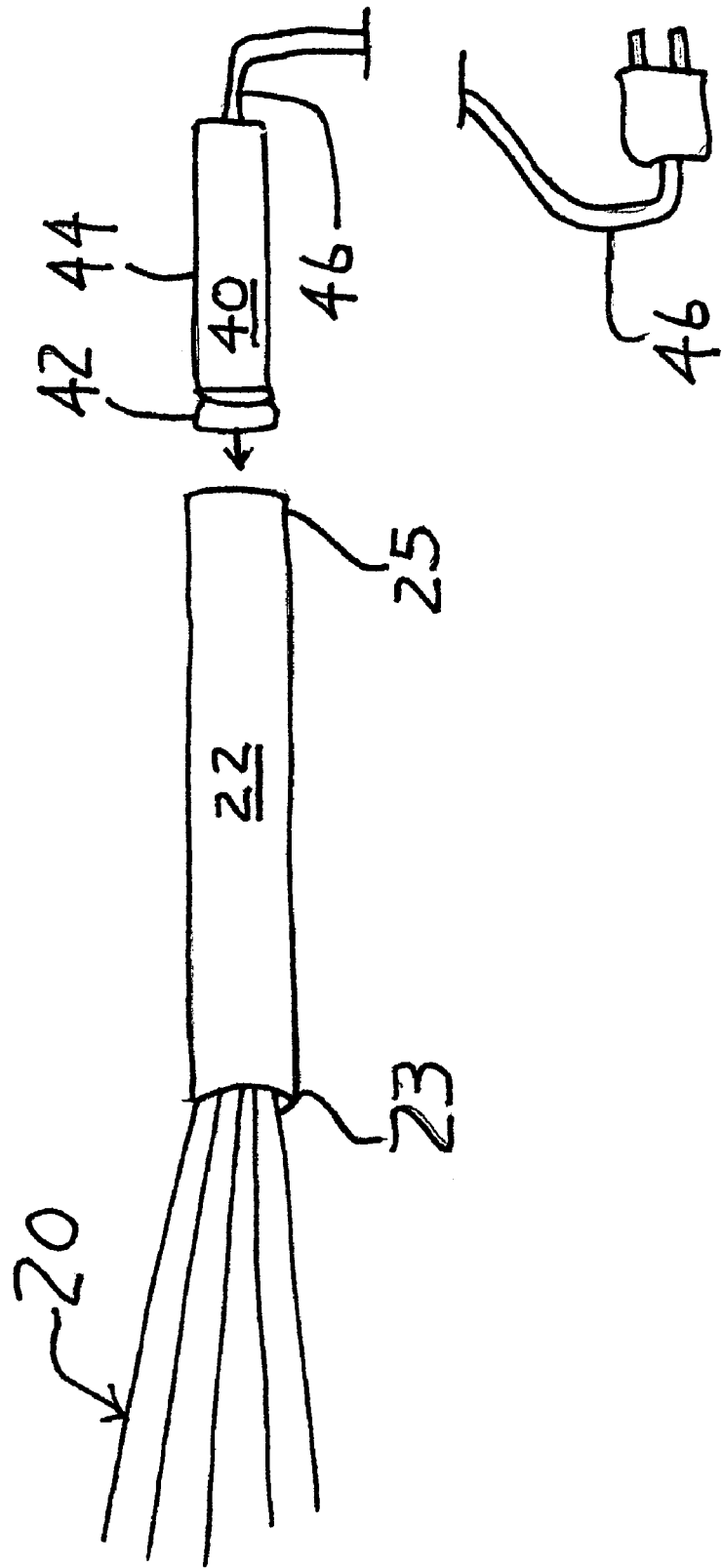
FIG. 1c is a plan side view illustrating, for exemplary purposes, optical fibers, a receptacle, and a powered light source according to the teachings of the present invention. Except for any electrical wiring emanating from the light source, the light source generally is not visible as it is normally inserted into the receptacle to emit light to the optical fibers held in the receptacle.

"Molding techniques" as used herein is defined as any number of techniques used to achieve a desired form or shape by pouring a liquid or a suspension, or by pressing a powder or a malleable substance, into a form or mold, which form or mold is to be removed when the desired form or shape is achieved.

"Pressing techniques" are defined herein as forming an object of a desired shape or form by forcing a malleable material, such as clay or hot glass, by way of example, into a mold, which material is then allowed to dry or set to a solid.

"Reversibly powered" as used herein means that the power may be turned on or off, as desired.

"Reversibly receive" as used herein means that the object being referred is adapted for receiving, as in holding, encompassing, accepting, surrounding, or the like a second object so that the received second object may be removed from the first object when desired.

"Setting" as used herein means the process that a molded, pressed, or poured material must go through to achieve its desired shape as a solid material, which can include drying, swelling, chemical transformations, or a combination thereof.

A List of the Reference Numbers and Parts of the Invention to which Numbers Refer 10 A self-illuminating fabricated solid object assembly emanating light in a desired pattern.
12 A fabricated solid block.
14 A visible surface of fabricated solid block 12.
16 Base of fabricated solid block 12.
18 A surface of fabricated solid block 12 containing aperture 30.
20 One of a plurality of optical fibers each having a first and a second end where the first end is visible on the visible surface of object 10.
22 A receptacle embedded in object 10 having second end 25 extending through aperture 30 and into which powered light source 40 may be reversibly inserted and having a first end 23 for containing the second end of the at least one optical fiber to collect light from the inserted light source.
22a A first receptacle embedded in object 10 adapted for mating a light source with the optical fibers that describe one pattern such as seasonal pattern 24a.
22b A second receptacle embedded in object 10 adapted for mating a light source with the optical fibers that describe a second pattern such as seasonal pattern 24b.
23 First end of receptacle 22.
24 One of a plurality of points of light emanating from the optical fibers that have their first end exposed at top surface 14.
24a One of a plurality of points of light emanating from the optical fibers that have their first end exposed at top surface 14 describing one seasonal pattern.
24b One of a plurality of points of light emanating from the optical fibers that have their first end exposed at top surface 14 describing another seasonal pattern.
25 Second end of receptacle adapted for holding light source 40.
26 Lights emanating from optical fibers that are exposed as the surface of the statuary that describes the eyes of the statute 60.
30 The at least one aperture on a surface of solid object 10.
40 A light source.
42 Light emitting part, i.e., LED (light emitting diode) light bulb, of light source 40.
44 Main body of light source 40 which, as illustrated, is packaged in a protective sleeve, and although not shown, consists of a light emitting diode.
46 Any known electrical connection providing power to light source 40.
50 A wedged shaped edge of a solid object, where the wedge creates a space for the insertion of electrical wiring, if so desired.
60 A piece of statuary.

It should be understood that the drawings are not necessarily to scale, for instance, aperture 30 is shown as a rather enlarged rectangle relative to the end of receptacle 22 that is accessible through aperture 30. Aperture 30, however, could just as well be depicted as an opening shaped to conform, in size and shape, to the outer surface shape of receptacle 22. In certain instances, details which are not necessary for an understanding of the present invention, or which render other details difficult to perceive, may have been omitted.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein.

The present invention is directed towards a self-illuminating fabricated solid, such as a paving stone or statuary. The illumination is provided by having one or more optical fibers embedded within the solid object with one end of the fibers adaptedly exposed at the object's surface to provide for a desired design or pattern, which design or pattern is expressed by the light emitting from fibers exposed at desired places on the surface of the object, while second ends of the optical fibers are contained within a first end of at least one open receptacle that is also embedded within the object except for the opening at the second end of the receptacle, which opening is exposed at a surface of the object. The exposed open end of the receptacle reversibly receives at least one reversibly powered light source which mates with the fibers' second ends for the purpose of guiding light from the light source through the fibers to the surface of the fabricated object providing for multi-colored, self-illuminating seasonal designs or patterns, informational text, or advertising. A plurality of designs in various colors may be present on a single self-illuminated solid object. These durable objects have a long life as surface exposed fibers wear with the surface of the object and worn-out light sources are easily and rapidly replaced.

Turning now to the drawings, FIGS. 1a–1c illustrate one exemplary preferred embodiment of the present invention. FIGS. 1a and 1b, transparent perspective views of self-illuminating fabricated solid object assembly 10, illustrate paving block 12 with self-illuminating text "HELLO" visible on the surface on the surface as shown in FIG. 1a. Paving block 12 comprises visually exposed surface 14, base 16 and surface 18 having at least one aperture 30. The transparency of the drawings allows for illustration of optical fibers 20 as they occur embedded within the matrix of the paving block. Also illustrated is embedded receptacle 22 having first end 23 and second end 25. During the fabrication of solid object assembly 10, optical fibers 20 and receptacle 22 are positioned within the initially liquid or otherwise malleable material, used in the formation of paving block 12, so as to provide for one end of optical fibers 20 to be visually exposed on a surface of object 10 while the other end of optical fibers 20 are securely enclosed in first end 23 of receptacle 22. Receptacle 22 is designed to prevent any damage to the light source, such as from lightning, static discharge, and over voltage conditions. Second end 25 of receptacle 22 is exposedly positioned in aperture 30 of receptacle 22 for easy accessibly after the paving stone is formed into a solid object. Positioned thusly, second end 25 is adapted for the reversible acceptance of reversibly powered light source 40 (see FIG. 1c) to provide for mating of light source 40 with the ends of optical fibers 20 that are enclosed in first end 23 of receptacle 22. Light source 40 is illustrated with affixed means for providing power 46 to light source 40. Mating light source 40 with the ends of optical fibers 20 that are enclosed in first end 23 of receptacle source provide means for light emitted from light source 40 to be guided from light source 40 to the ends of the optical fibers that terminate on the visually exposed surface of the fabricated solid object providing for self-illumination of the fabricated solid object.

FIG. 1c illustrates first end or light bulb 42 of light source 40 positioned for its reversible insertion into second end 25 of receptacle 22 SO that the reversibly powered light emitted from light source 40 is brought into intimate contact with the second end of optical fibers 20 and, thus, caused to travel along the length of the fibers from the second end of the fibers enclosed in first end 23 of receptacle 22 to the first ends of fibers 20 that are exposed on a visible surface of a self-illuminating solid object.

Figure 2:
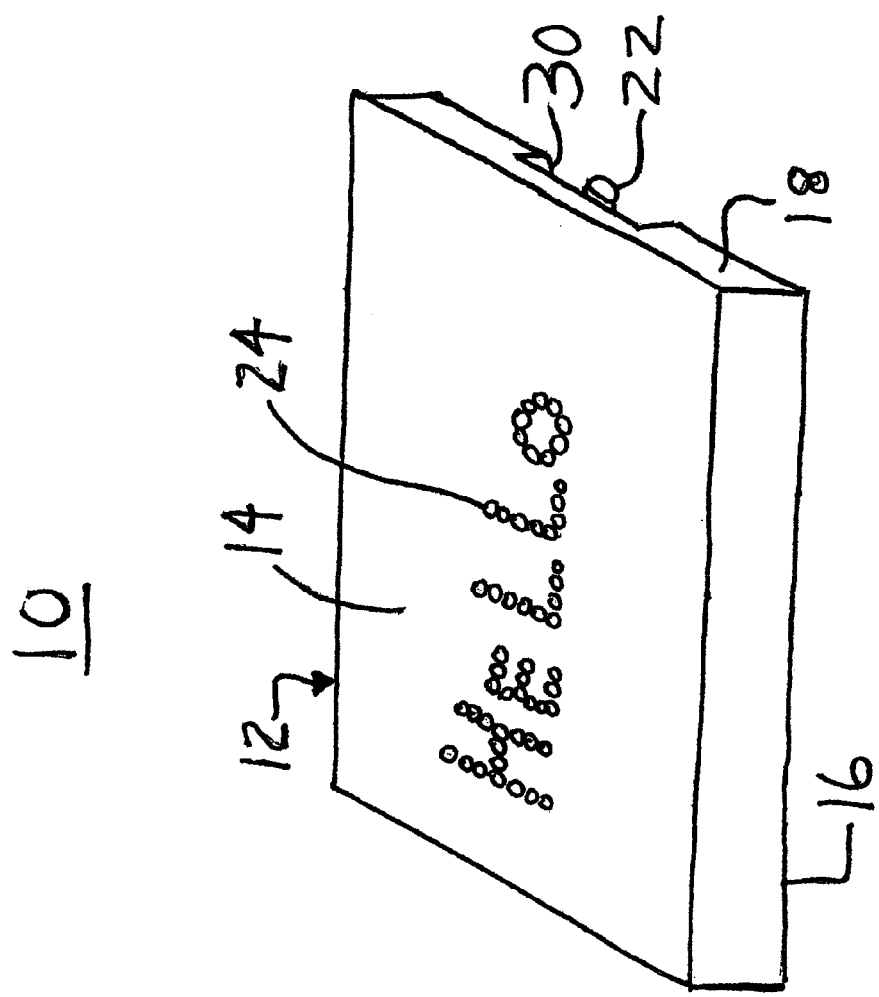
FIG. 2a is a non-transparent perspective view of an object of the present invention, as shown in FIG. 1.

FIG. 2, a non-transparent view of a self-illuminating fabricated solid assembly, shows a paving block according to the teaching of this invention as it appears ready for use. The ready accessibility of second end 25 at aperture 30 of receptacle 22 ensures that light sources may be inserted and removed easily and rapidly, as desired. As mentioned above, aperture 30 is not required to be as large as it is in the illustrations. It need be only as large as required to hold receptacle 22. The illustrations are designed for clarity of explanation.

Light sources may suffer from usage or from age or may be defective as supplied. In any of these instances, a replacement of the light source may be necessary. In the invention as disclosed, replacement of a light source is accomplished rapidly and easily. The old light source is removed from receptacle 22 by a slight pull or tug. Once the old light source is removed, a new light source is easily and rapidly inserted into receptacle 22. Alternatively, a light source may be in perfect working condition, but one may desire to change the color emitted by the light source. Any known light source may be used, but in the preferred embodiment illustrated, the light source is a light emitting diode (LED) which, of course, is a low-powered light source and is inexpensive to operate. Traditional bulbs, if desired, may also be employed.

In the preferred embodiment illustrated, the power source is from a low power voltage source, or alternatively relies on the corrective action of a resistor and or rectifier and/or inverter, and on traditional wiring. The power source used to provide power to the light source, however, can be any known power source. For example, solar power is also contemplated as a power source.

The preferred self-illuminating fabricated solid object assembly 10 comprises block 12 cast from concrete, cement, or any other moldable material that will provide the properties desired for the block as described, or for any of other desired fabricated self-illuminating objects that can be made according to the present invention. The casting or molding material may be added to the mold after the optical fibers and the receptacle holding one end of the fibers have been arranged in the mold. If this is the manufacturing process employed, then it is at this time that the ends of the optical fibers that will terminate at the surface of the object are positioned so as to achieve the desired pattern that will be described by the light that will emanate from the fibers exposed at the object's surface. The fact that the self-illuminating fabricated solid comprises a negligible amount of void space from the addition of the fibers and the receptacle to the object, the resulting objects, such as a paving stone or block, retains properties that are comparable to those of objects that are cast or molded without the addition of the fibers and the receptacle. Regardless of the material used or method for making employed, any of the contemplated self-illuminating fabricated solid objects as claimed may be of virtually any shape, including interlocking, radius or traditional squares, spheres, and all other polygonal shapes, animal, people, imaginary characters such as angels, gargoyles, or unicorns, water fountains of any of the above and other designs, and so forth. In the preferred embodiment illustrated, the paving block 12 has a substantially square or rectangle shape and may, of course, include rounded corners and edges to prevent chipping. The cast or molded material may be colored in the manufacturing process by the addition of pigments to achieve almost any desired color. In addition, the top surface 14 of the paving block 12 may be sealed with any known transparent or translucent surface treatment to form a water resistant layer while preserving the illumination effect. Further, the paving block 12 may be manufactured having almost any desired surface texture and/or pattern, such as slate, cobblestone, brick, or the like. Thus, it can be seen that the present invention provides for a self-illuminated solid surface that is impervious to the damaging effects of both physical and chemical weathering and to the daily wear that occurs when the surface is subject to both pedestrian and vehicular traffic.

Figure 3:
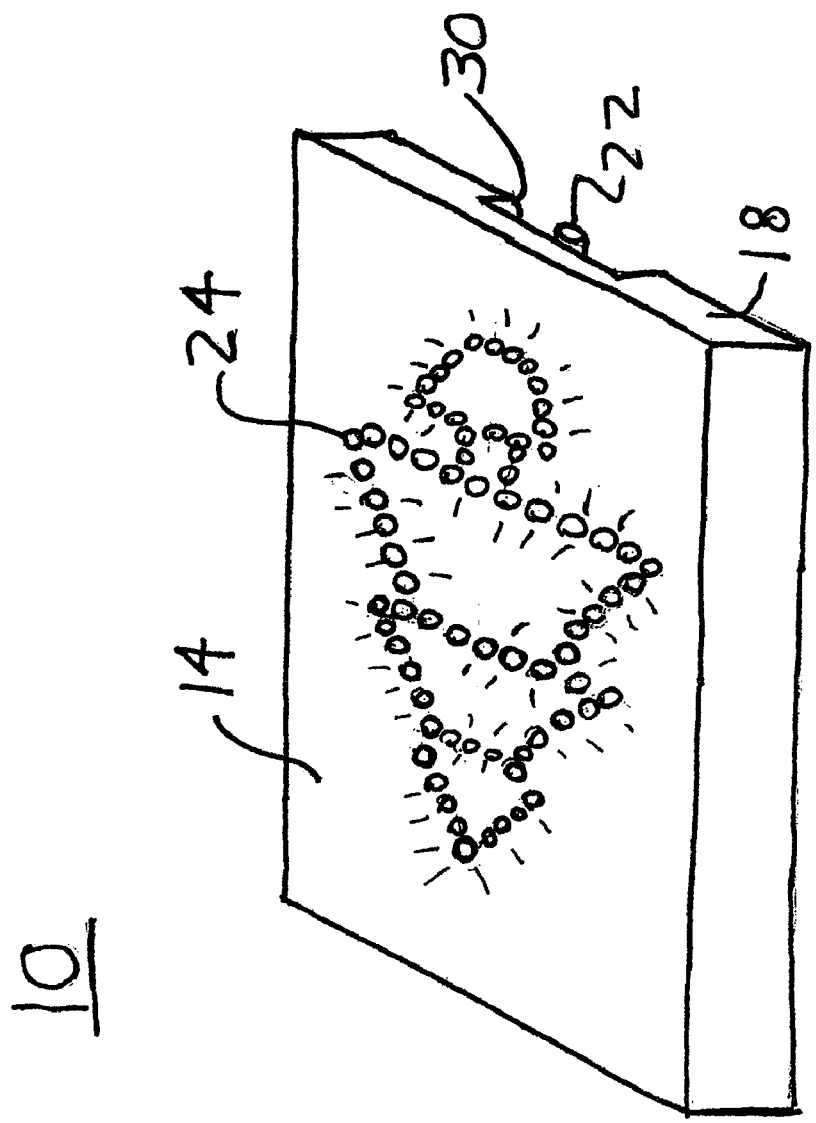
FIG. 3 is a perspective view of an object of the present invention, similar to the object shown in FIG. 1, except for the pattern defining a light pattern in a seasonal design.

FIG. 3 illustrates a self-illuminating fabricated solid object having a seasonal pattern created by the light emitting ends of the optical fibers that are exposed on the visible surface of the object. Nearly any desired pattern, design, numbers, or letters may be formed on the surface of an object.

Figure 4:
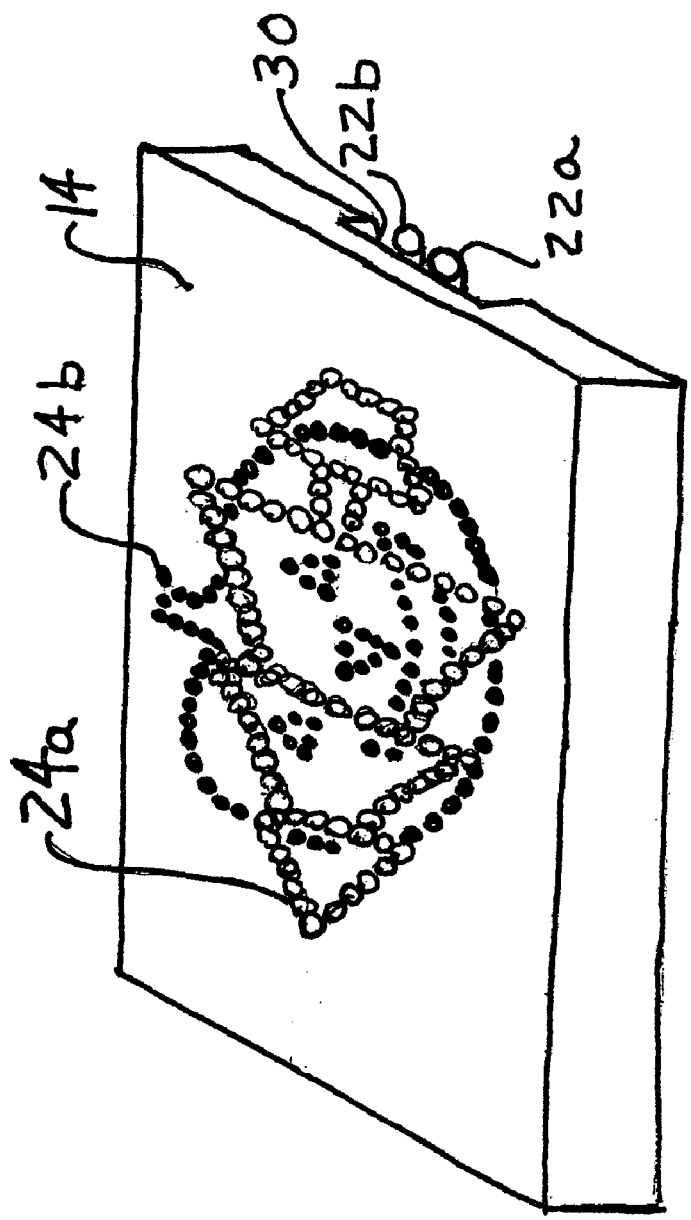
FIG. 4 is a perspective view of an object of the present invention showing two seasonal patterns on the visually exposed surface of the fabricated solid each pattern having a related optical fiber receptacle.

FIG. 4 illustrates a self-illuminating fabricated solid object having two seasonal patterns emitting light (see 24a and 24b for example) on its visible surface. Each pattern is formed by a unique set of optical fibers in working association with a related unique receptacle, such as 22a or 22b. In the example illustrated, one may insert an orange light emitting source into the receptacle that is operatively connected to the optical fibers whose visually exposed tips describe the pumpkin pattern, and at another time, one could insert a light source that emits green light into the receptacle that is operatively connected to the optical fibers whose visually exposed tips describe the holiday tree. During the time period in which one does not desired to display a specific pattern, the light source providing the light required for the pattern is simply removed from the relevant receptacle. If desired, a plug or cap may be inserted into the receptacle to protect it from any harmful environmental conditions. It is further contemplated that each self-illuminating object assembly may comprise a plurality of predetermined patterns on its visually exposed surface, as desired. It is also further contemplated that a regulating switch be used to alternate the power from one light source to another if a flashing or blinking display is desired. It is still further contemplated that a set of switches and/or timers are used to simulate motion, such as when a plurality of designs are on one object, or single designs on a plurality of objects, and where the on/off action of the power to the various designs creates an image of motion. This can be visualized, for example, as an arrow that appears to move toward an entrance way when in reality it is a series of self-illuminating arrows in a series of walkway paving blocks that are sequentially connected and disconnected to a power source by the regulating switches and timers.

Figure 5:
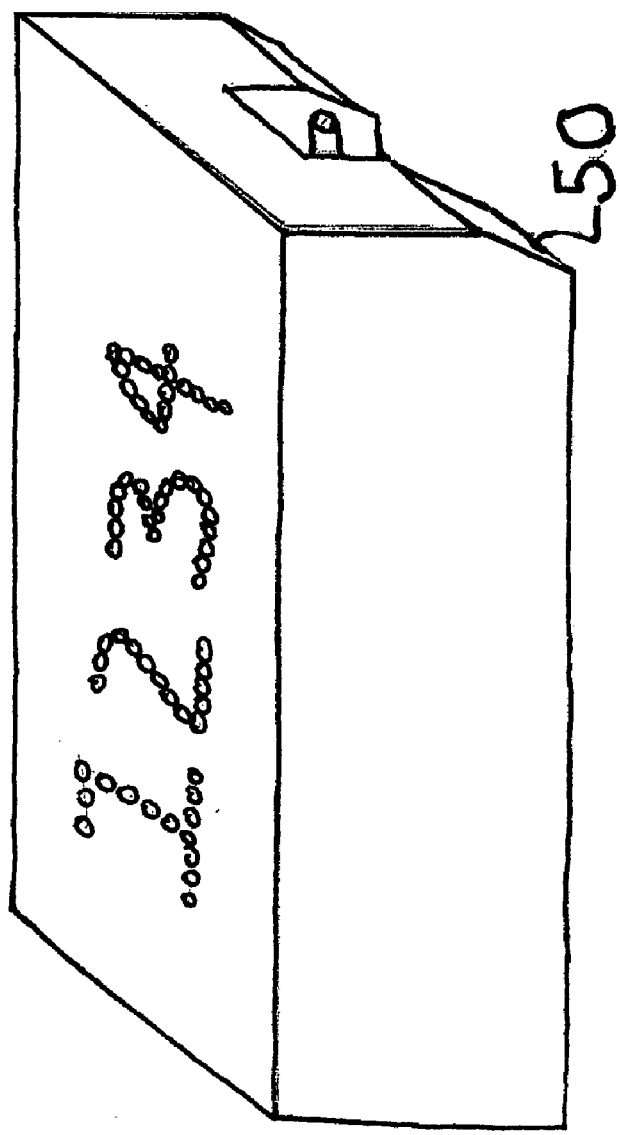
FIG. 5 is a perspective view showing an object of the present invention with a wedge shaped edge on its base to accommodate any electrical wiring that may be present if it is desired to place the invention on a hard surface.

When a series of self-illuminating solid objects, such as self-illuminating paving stones or blocks, are placed on unconsolidated, compressible material, such as sand or crushed stone, the wiring used to connect the system to a power source and the wiring that is used to interconnect the blocks may conveniently be buried in the sand or crushed stone. If, however, it is desired to place self-illuminating fabricated solid objects on a hard surface, there is the problem of where to place the power providing wires. FIG. 5 illustrates a means for placement of self-illuminating blocks on a hard surface. To accomplish this, each object, such as a paving block, that is to be placed on top of a hard surface comprises at least one beveled or notched base edge 50. The beveled or notched edge provides a space just sufficient to accommodate any required electrical wiring. If there are a series of adjacent blocks, such as when the blocks are used to construct a patio floor, a garden walk, or a driveway, the small, but sufficient space created by the bevel or notch provides a protected conduit for any required wiring. The connective wiring is protected from the damaging effects of traffic or weather. In fact, because no wiring is exposed on the surface, self-illuminating blocks made according to this invention can be placed even on surfaces that are likely to suffer from seasonal snow plowing. Note, that, if desired, self-illuminating fabricated solid objects, such as blocks or stones, are just as amenable to installation in a vertical position to form a wall surface or a fence. In this instance, the wiring is also protected by positioning the wire within the protective conduits created by beveling or notching at least one base edge. The conduits provide not only for the physical and chemical protection of any required wires but provides for additional aesthetic appeal; e.g., tucking the wiring in the grooves assures that the wiring is not exposed in an unsightly manner. The bevel or notch, like the aperture provided for the receptacle, is minimally sized so as not to reduce the strength of the block. Therefore, it can be seen that the present invention provides for a system that can be used on any previously formed hard surface, whether the surface is a horizontal, vertical, or inclined, as well as on unconsolidated materials, new or old.

Figure 6:
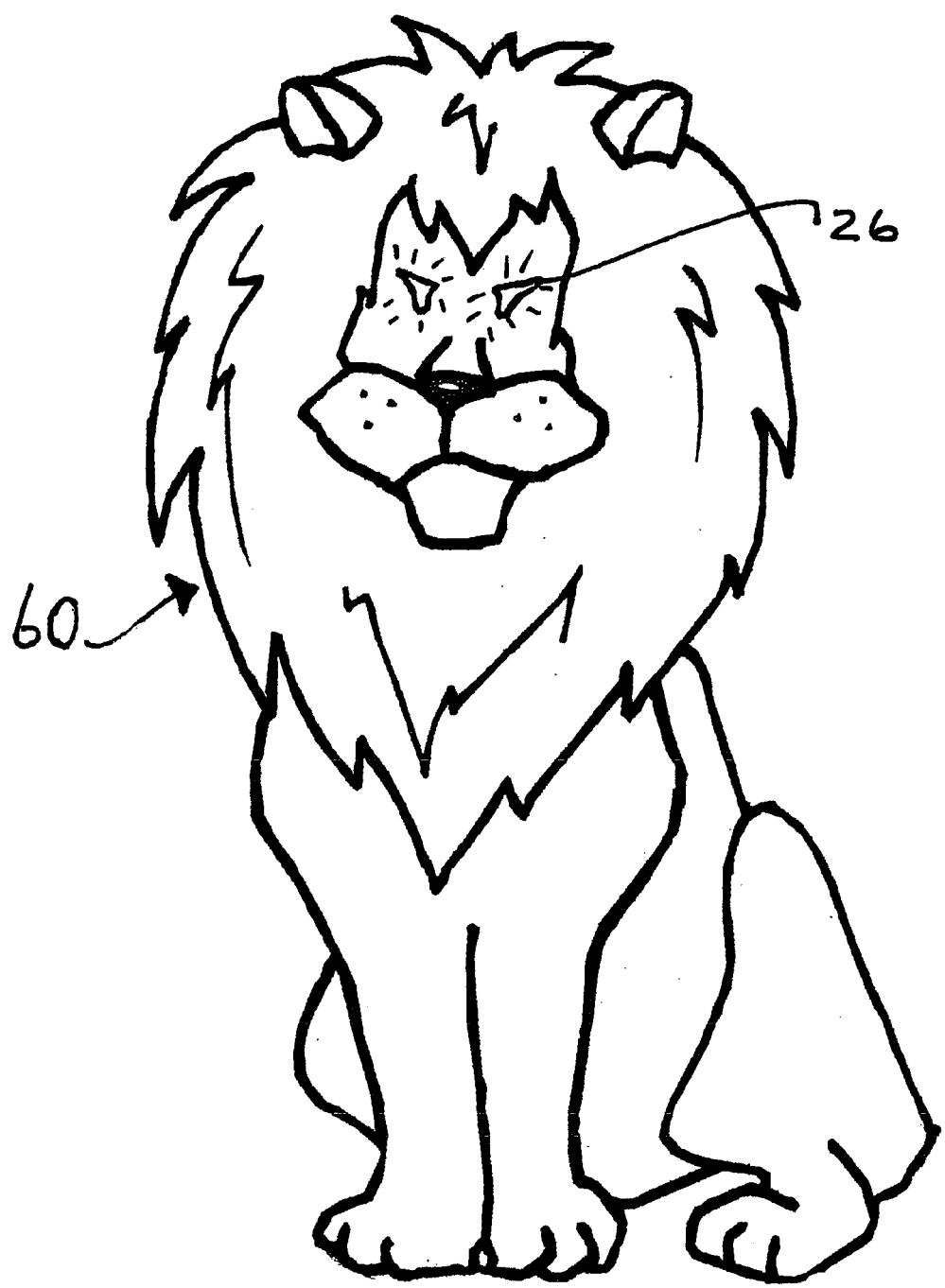
FIG. 6 is a perspective view showing an example of how an object of the present invention is shaped to form solid self-illuminating statuary.

As mentioned earlier, the self-illuminating fabricated solid objects may be formed into almost any desired size and shape and of almost any color to address any aesthetic. One popular use for concrete or cement is to prepare statuary, especially the statuary so coveted as lawn and yard decoration. FIG. 6 illustrates a self-illuminating fabricated solid object in the form of a lion. Such statuary is often seen in the entrances to homes. Attractive in the daylight, such statuary is hardly, if at all, visible at night. In fact, it is conceivable that such statuary could pose a tripping hazard if approached in the dark. FIG. 6 illustrates how an attractive piece of statuary can also provide for illumination at night. The eyes 26 of the lion are defined by light emitting optical fibers according to the teaching of this invention. Statuary made according to this invention provides a welcoming and safe beacon to a home's entrance.

The self-illuminating fabricated object described herein has a multitude of uses. An object can be used alone, such as using a single self-illuminating building block, to provide for self-illuminating house number signs and/or name plaques that are set into a building wall. In many cases, a plurality of self-illuminating, fabricated objects can be used together to construct large area or large volume, self-illuminating objects. For instance, if an object is shaped as a paving stone, the self-illuminating objects can be used to form walkways, driveways, walls, and fences. Such paving stones can be fabricated to any shape including squares, rectangles, circles or any other regular or irregular polygon. Alternatively the paving stones can be shaped to mimic naturally occurring pavers. When used in this way, these pavers have strength and endurance comparable to that of non-self-illuminating pavers. They can be walked over and can easily sustain the weight of most vehicles. Another novel use for this invention is to insert light source 40 into apertures other than those found in fabricated objects, such as apertures fabricated into columns, railings, steps, edge portions of porches and decks, window trim, doors, cupboard faces, molding, picture frames, furniture, and the like. Using the light source of this invention in this way is limited only by a materials inability to comprise apertures adapted for receiving light sources according to the teachings of the present invention. The aperture(s) may be arranged to reproduce or complement a light pattern or design in a near-by self-illuminated fabricated material object, such as the paving stones of a walk or driveway. Such a continuity of light, along the path traversed to a secluded entrance way, for example, would reduce the incidence of falls or missteps when approaching difficult to see steps, a turn in the walkway, or the like. Such a continuity of light would also act as a design element to induce, or invite, persons to follow the lights to enter a building, such as a shop or a nightclub.

As each of the at least one optical fiber is set into the fabricated solid so that only the first end terminates flush with, and thus is visible at, the visible surface of the object, the fibers are protected by the material into which they are cast. This means that the fibers will wear at the same rate as the fabricated material and, thus, could be expected to last the lifetime of the fabricated material object. Although the fibers and the receptacle by which the fibers are held are permanently sealed and imbedded within the body of the self-illuminating object, the light source, which is the only part of the assembly that might suffer with age, is removable and, thus, is easily and quickly replaced, without the necessity of replacing an entire object. Because of the low cost of the optical fibers, the light source, and standard electrical wiring, the cost to manufacture and maintain the self-illuminating objects is only minimally more than the cost of manufacturing and maintaining objects without the self-illumination assembly. Maintenance costs can be kept low by utilizing timers or photoelectric power or switches.

The illuminating fibers can be arranged to provide for nearly any type of desired patterns, designs, or informational messages. During low light hours, a self-illuminating paver or block could be used to warn people that a step must be traversed. The warning could be simply light emanating from a random pattern, a nearly solid bar of illumination, or by arranging the fibers to describe the work "STEP". Accordingly, the entrance to a drive way, house numbers, the name of a home's occupants, all can be self-illuminating utilizing a horizontal or vertical surface.

Light sources are available in a wide variety of colors. A neutral design or pattern can be made to reflect a holiday or a particular celebration by simply changing the color of the light source. Reds and greens can be used to celebrate a holiday such as Christmas, purple and yellow for Easter, red for Valentines Day, and so forth. The light sources are not expensive and are particularly easy to change so these special effects are easy for almost anyone to achieve. Additionally, most light sources, especially LED light sources are long-lasting and come in a large variety of colors that do not change or diminish with age or temperature.

When self-illuminating solid object assemblies are contemplated for use in a low traffic area, the object could be fabricated from a softer transparent or translucent material resulting in a vast number of light-emitting design options.

The foregoing description, for purposes of explanation, uses specific and defined nomenclature to provide a thorough understanding of the invention. However, it will be apparent to one skilled in the art that the specific details are not required in order to practice the invention. Thus, the foregoing descriptions of specific embodiments are presented for purposes of illustration and description. They are not intended to be exhaustive or to limit the invention to the precise forms disclosed. Those skilled in the art will recognize that many changes may be made to the features such as shape, color, materials, other embodiments, and methods of making the embodiments of the invention described herein without departing from the spirit and scope of the invention. Furthermore, the present invention is not limited to the described methods, embodiments, features or combinations of features but includes all the variation, methods, modifications, and combinations of features within the scope of the appended claims. The invention is limited only by the claims.

What is claimed is:

1. A self-illuminating fabricated solid object assembly comprising:
   a) a fabricated solid object having at least one visually exposed surface and having at least one aperture open to an outer surface:
   b) at least one optical fiber embedded within said fabricated solid object, said fiber having a first end and a second end, said first end of said fiber arranged to terminate at said at least one visually exposed surface of said fabricated solid object;
   c) at least one receptacle embedded within said solid object, said receptacle having at least a first end and a second end, said first end of said receptacle adapted to encompass said second end of said at least one optical fiber, said second end of said receptacle operatively coupled with said aperture;
   d) at least one reversibly powered light source, with said second end of said receptacle adapted to reversibly receive said light source providing for operative contact of said light source with said second end of said fiber enabling light emitted from said light source to be guided from said light source through said fiber, whereby light is emitted from said visually exposed surface of said fabricated object.

2. The self-illuminating object assembly, as recited in claim 1, wherein said fabricated solid is fabricated using any known solidification means.

3. The self-illuminating object assembly, as recited in claim 2, wherein said known solidification means includes setting techniques.

4. The self-illuminating object assembly, as recited in claim 2, wherein said known solidification means includes pressing techniques.

5. The self-illuminating object assembly, as recited in claim 2, wherein said known solidification means includes molding techniques.

6. The self-illuminating object assembly, as recited in claim 1, wherein said assembly further comprises a plurality of optical fibers.

7. The self-illuminating object assembly, as recited in claim 6, wherein each first end of each of said plurality of optical fibers is positioned to define at least one predetermined pattern on said visually exposed surface of said fabricated solid object.

8. The self-illuminating object assembly, as recited in claim 7, wherein said self-illuminating object assembly further comprises a plurality of predetermined patterns on said visually exposed surface of said fabricated solid object, wherein each pattern's illumination is provided by a unique light source.

9. The self-illuminating object assembly, as recited in claim 8, wherein each said unique light source provides a unique colored light.

10. The self-illuminating object assembly, as recited in claim 8, wherein said plurality of predetermined patterns comprise seasonal designs.

11. The self-illuminating object assembly, as recited in claim 8, wherein said plurality of predetermined patterns comprise informational messages.

12. The self-illuminating object assembly, as recited in claim 8, wherein said plurality of predetermined patterns comprise advertising.

13. The self-illuminating object assembly, as recited in claim 1, wherein said self-illuminating object assembly further comprises a notched base.

14. The self-illuminating object assembly, as recited in claim 1, wherein said self-illuminating object further comprises statuary.

15. The self-illuminating object assembly, as recited in claim 1, wherein said self-illuminating object further comprises a paving stone.

16. The self-illuminating object assembly, as recited in claim 1, wherein said self-Illuminating object further comprises a building block.

17. The self-illuminating object assembly, as recited in claim 1, wherein said self-illuminating object further comprises a transparent object.

18. The self-illuminating object assembly, as recited in claim 1, wherein said light source further comprises a light emitting diode.

* * * * *